F. E. REUSHER.
PIPE COUPLING.
APPLICATION FILED APR. 29, 1909.

1,021,264. Patented Mar. 26, 1912.

Witnesses
Fenton S. Belt

Inventor
Frank E. Reusher
By Victor J. Evans
Attorney

UNITED STATES PATENT OFFICE.

FRANK E. REUSHER, OF PITTSBURGH, PENNSYLVANIA.

PIPE-COUPLING.

1,021,264.   Specification of Letters Patent.   Patented Mar. 26, 1912.

Application filed April 29, 1909. Serial No. 492,958.

*To all whom it may concern:*

Be it known that I, FRANK E. REUSHER, a citizen of the United States, residing at Pittsburgh, in the county of Allegheny and State of Pennsylvania, have invented new and useful Improvements in Pipe-Couplings, of which the following is a specification.

This invention relates to pipe couplings, and has for an object to provide a device of this character particularly adapted for use in the connection of two alining pipes and is particularly desirable in connection with lead pipes or those formed from soft metal and to provide means adapted to be connected to the alining pipe sections in a novel and simple manner, the said means serving in conjunction with the remaining portion of the coupling to hold the pipe sections effectively connected to each other and to provide an efficient air and water tight joint.

Other objects and advantages will be apparent as the nature of the invention is better set forth, and it will be understood that changes within the scope of the claim may be resorted to without departing from the spirit of the invention.

Figure 1:
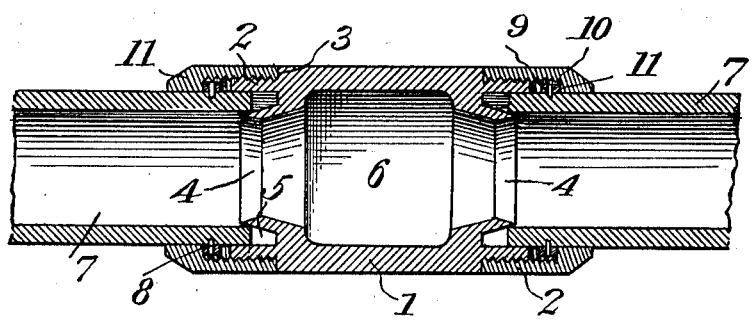
Figure 2:
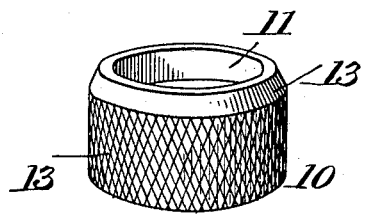
Figure 3:
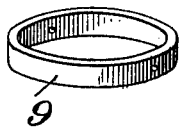

In the drawing, forming a portion of this specification and in which like numerals of reference indicate similar parts in the several views:—Figure 1 is a longitudinal section through the coupling showing it in its operative position in connection with two alining pipe sections. Fig. 2 is a detail perspective view of one of the elements of the coupling. Fig. 3 is a detail perspective view of one of the pipe engaging rings or washers.

As shown in the drawing, the pipe coupling consists of a main body portion or sleeve 1 provided at its ends with annular exteriorly threaded flanges 2 adapted to form at the ends of the body portion or sleeve 1 annular shoulders 3. The body portion or sleeve 1 of the coupling is provided at the ends with substantially conical or tapered portions 4 that have their annular walls disposed in spaced relation to the interior walls of the flanges 2 so as to provide between the flanges 2 and the conical or tapered portion 4 substantially V-shaped spaces or recesses 5. The body portion or sleeve 1 is provided with a chambered portion or bore 6 disposed immediately in line with the bores of the portions 4. Pipe sections 7 are illustrated in Fig. 1 and each has secured thereto by means of screw threaded studs or similar fastening devices 8 a ring or washer 9 adapted to form a stop shoulder for a purpose to be hereinafter more fully described. Each of the said pipe sections has revolubly and slidably mounted thereon a sleeve 10 which has interiorly threaded portions for engaging the exteriorly threaded portions of the flanges 2 of the sleeve or body portion 1 of the coupling. The sleeves 10 are provided at their outer ends with annular shoulders 11 which are positioned or arranged in such manner as to be brought into frictional engagement with the rings 9. The sleeves 10 are provided with milled outer faces 12 and the said sleeves are also provided with beveled outer end portions 13.

In operation, when it is desired to connect the pipe sections 7, the sleeves 10 are positioned upon each of the sections, the rings or collars 9 are then properly adjusted and secured to their respective sections, after which the sleeves 10 are positioned in a manner to house the rings or collars. The construction of each sleeve 10 is such that its interiorly threaded surface is disposed in spaced relation to the outer walls of its pipe section so that the said sleeve can be effectively engaged with the exteriorly threaded portions of the flanges 2 of the sleeve or body portion of the coupling. The sleeves 10 can be adjusted upon and engaged with the flanges 2 in such manner that the shoulders or flanges 11 will be frictionally engaged with the rings 9 so that the inner extremities of the pipe sections will be forced into the recesses or grooves 5, and the inner edges of the said pipe sections will be effectively frictionally engaged with the walls of the portions 4 of the body portion of the coupling so as to form at each end a perfect air and water tight joint.

The device herein described is particularly adapted for use in connection with lead pipes or those formed from soft metal, but it is obvious that its construction is such as will permit it to be effectively used in connection with any forms of pipes regardless of the kind of material from which the pipes are made.

The conical or tapered portions 4 of the member have their outer faces disposed inwardly of the outer faces of the flanges 2 of the said member to facilitate the insertion of the ends of the pipe sections between the walls of the said conical or tapered portions and the walls of the said flanges.

I claim:—

A pipe coupling including the adjacent ends of pipe sections, a cylindrical sleeve formed with reduced end sections exteriorly threaded, said sleeve being further formed with V-shaped recesses, oppositely tapering nipples integrally formed at the ends of the sleeves and having tapering bores, the outer surface of said tapering nipples forming the inner inclined faces of the said recesses whereby to form a liquid-tight joint between the coupling and the ends of said pipe sections by reason of the wedging action of said inclined faces of the recesses, said sleeve having an enlarged bore intermediate its ends and of a greater diameter than the greatest diameter of the tapering bores of said nipples, annular rings secured exteriorly with relation to and spaced from the ends of said pipe sections, and interiorly threaded collars movably secured upon said pipe sections and formed to provide interior flanges at their outer ends whereby to engage with said annular rings, said collars adapted for engagement with the reduced end sections of said sleeve and of a diameter equal to the greatest diameter of said sleeve whereby to provide a smooth exterior for the entire length of said coupling.

In testimony whereof I affix my signature in presence of two witnesses.

FRANK E. REUSHER.

Witnesses:
CASPER GALLENZ,
JOSEPH H. GELBAKER.

Copies of this patent may be obtained for five cents each, by addressing the "Commissioner of Patents, Washington, D. C."